(No Model.)
J. C. RUSSELL.
MACHINE FOR DIVIDING OR SPLITTING METAL.
No. 376,914. Patented Jan. 24, 1888.
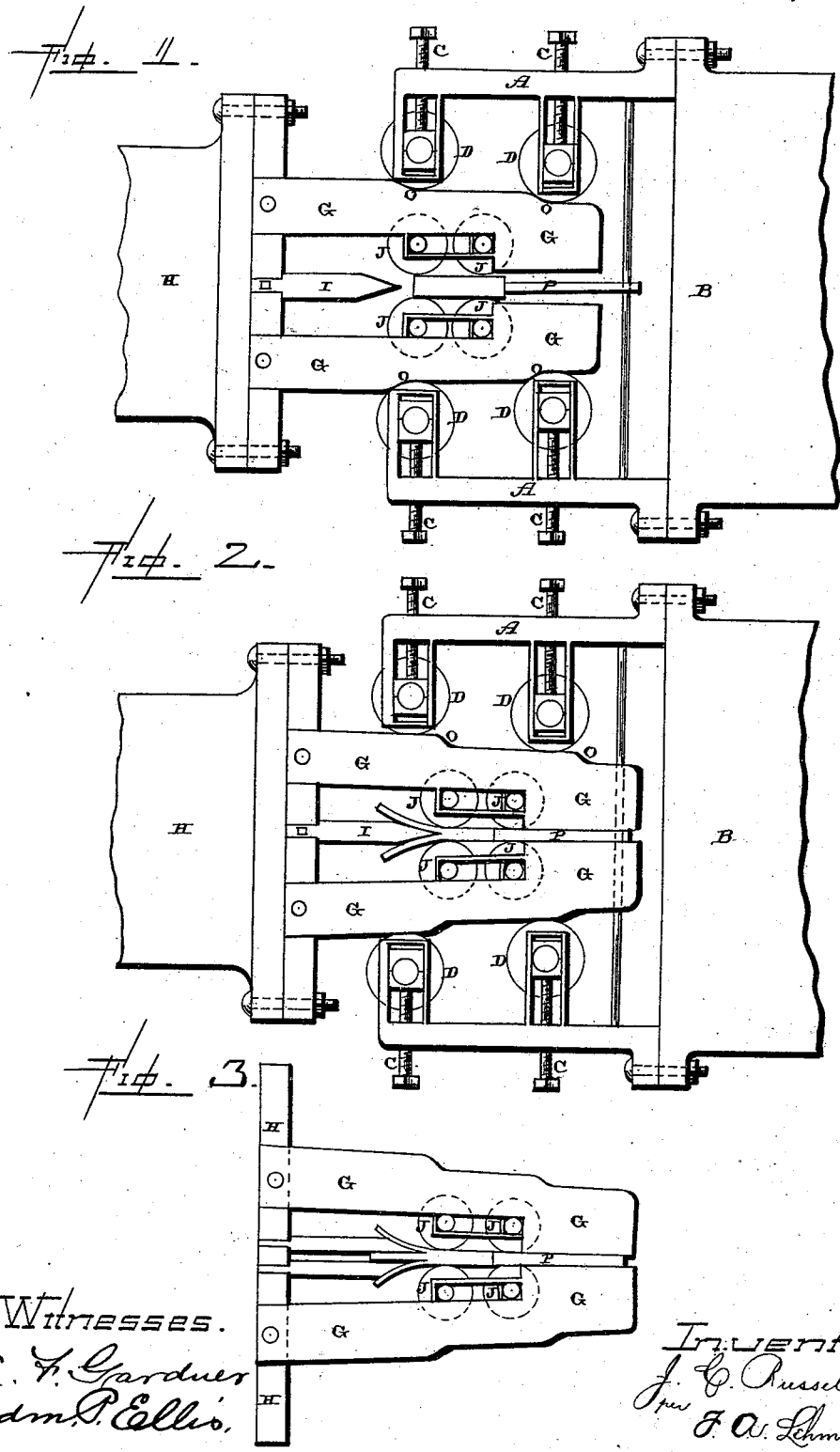

UNITED STATES PATENT OFFICE.

JAMES C. RUSSELL, OF BEAVER FALLS, PENNSYLVANIA.

MACHINE FOR DIVIDING OR SPLITTING METAL.

SPECIFICATION forming part of Letters Patent No. 376,914, dated January 24, 1888.

Application filed December 1, 1887. Serial No. 256,670. (No model.)

*To all whom it may concern:*

Be it known that I, JAMES C. RUSSELL, of Beaver Falls, in the county of Beaver and State of Pennsylvania, have invented certain new and useful Improvements in Machines for Dividing or Splitting Metal; and I do hereby declare the following to be a full, clear, and exact description of the invention, such as will enable others skilled in the art to which it pertains to make and use it, reference being had to the accompanying drawings, which form part of this specification.

My invention relates to an improvement in machines for dividing or splitting metal; and it consists in a stationary frame provided with friction-rolls and a suitable support upon which the heated piece of metal is to be placed, the drop or machine-head having rigidly secured thereto the cutter or cutters for splitting or dividing the metal, and two pivoted bearings, which carry one or more pairs of drawing-rolls for drawing the metal which is to be split to a uniform thickness just previous to splitting, as will be more fully described hereinafter.

The object of my invention is to combine in a single machine rolls for drawing the metal which is to be split to a uniform thickness just prior to the splitting of its end, whereby all of the split pieces have a uniform thickness, which is not the case where the blanks are not rolled.

Figure 1 is a plan view of a machine which embodies my invention, the rolls being shown in the act of rolling the piece of metal. Fig. 2 is a similar view showing the metal being split just after having been rolled. Fig. 3 shows a slight modification, and showing how two cutters may be used instead of one.

A represents the sides of the machine, which are secured to a suitable frame-work, B, of any suitable construction. This frame-work A extends horizontally or vertically, according to the direction in which it is desired to have the cutter or cutters move. If the cutter is to have a horizontal motion, the frame will extend parallel with the floor, and if the cutter is to operate vertically the frame sets vertically. Passing through opposite sides of this frame-work A are the set-screws C, by means of which the bearings for the rolls D may be adjusted in and out for the purpose of regulating the distance between them. These rolls extend at right angles to the frame A, and have no movement except when the pivoted or laterally-moving bearings G come in contact with them. These bearings G are either to be of the form here shown or any other that may be preferred, and are pivoted to the movable head H, of any suitable construction.

The head H may either be operated by means of a drop or by suitable machinery of any kind, as this forms no special part of this invention. These bearings G are placed upon opposite sides of the cutter or cutters I, by means of which the metal is to be split, and at the same time form bearings for one or more pairs of rolls, J, by means of which the metal is drawn to a uniform thickness just prior to being split. The outer edges of the bearings G are provided with a number of steps or shoulders, O, according to the number of rolls D, and these steps or shoulders serve, by coming in contact with the rolls D, to force the rolls J against opposite sides of the piece of metal which is to be rolled and split, and thus cause the rolls J as they move along opposite surfaces of the piece of metal to draw it to a uniform thickness. The piece of metal which is to be drawn and split is heated to a suitable heat, and then placed against the support P. When the head H is moved forward or downward, the ends of the bearings G catch in between the rolls D, so as to bring the rolls J against opposite sides of the piece of metal, and as the supports G continue their downward or inward movement the rolls J roll or draw the piece of metal to the thickness it is to have just prior to being split. The cutter or cutters I are brought in contact with the end of the piece of metal, and the metal is split or divided any regulated distance into two, three, or more parts, as may be desired. The object of rolling the metal, as here shown, just prior to splitting is, that the pieces of metal in being heated will lose more or less by scaling, and hence their thicknesses vary considerably when they come to be split or divided. In order to overcome this trouble, I make each of the pieces of metal which are to be split slightly thicker than is necessary, and then roll them to one uniform thickness, as is here shown. In case the piece of metal is to be divided into two or more parts two cutters will be employed, as shown in Fig. 3, and these cutters will be separated a suitable distance from each other to form the central portion of the metal, as shown. If the metal is to be divided into a greater number of parts, then the cutters must be correspondingly changed.

The cutter is here shown as movable; but, if preferred, the cutter may be made stationary and the frame movable, as may be preferred.

Having thus described my invention, I claim—

1. The combination of rolls for drawing the piece of metal to a uniform thickness, movable supports in which the rolls are journaled, rolls or bearings between which the supports are forced, and the cutter or cutters for dividing or splitting the piece of metal, substantially as shown.

2. The combination of the frame, the adjustable rolls D, connected to the frame, the head or drop, the cutter or cutters secured to the head, the pivoted supports carrying one or more pairs of rolls, and the support upon which the piece of metal to be operated upon is placed, substantially as described.

3. In a machine for splitting metal, the combination of an endwise-moving cutter or cutters, a stationary bearing upon which the heated piece of metal to be split is placed, and rolls for drawing or reducing the thickness of the piece of metal to a uniform thickness just prior to the splitting, both the cutter and movable bearings for the rolls being connected to the same head or drop, substantially as set forth.

In testimony whereof I affix my signature in presence of two witnesses.

JAMES C. RUSSELL.

Witnesses:
F. A. LEHMANN,
EDM. P. ELLIS.